Sept. 6, 1932. E. J. ENS 1,875,917
OPERATING MEANS FOR FRONT FEED PLATENS
Filed Aug. 27, 1929 9 Sheets-Sheet 5

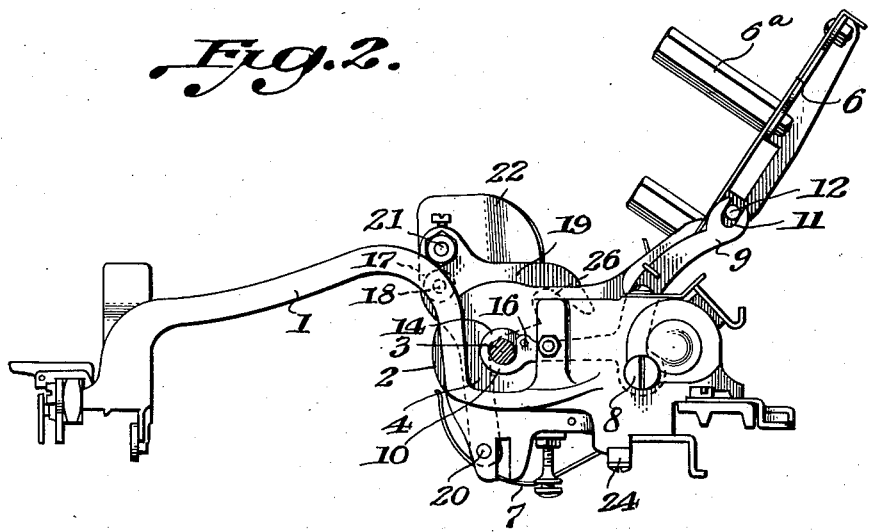
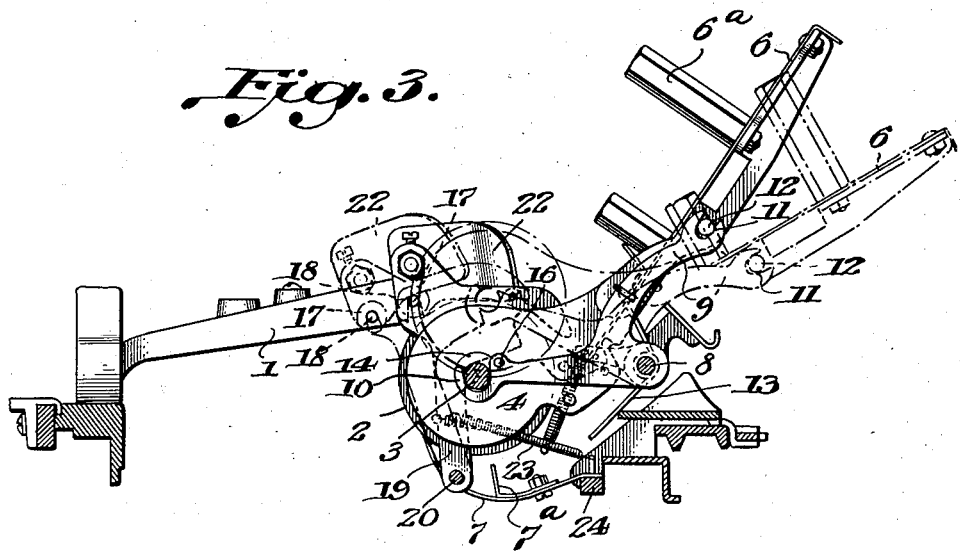

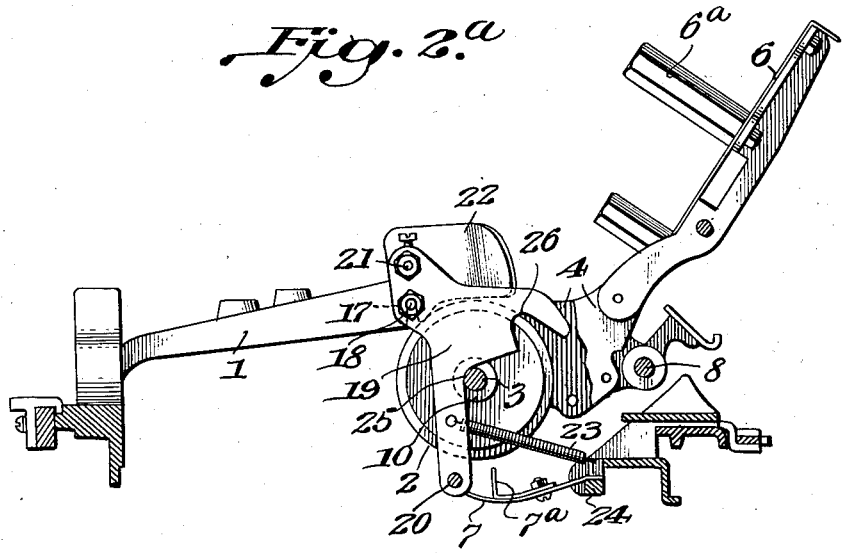
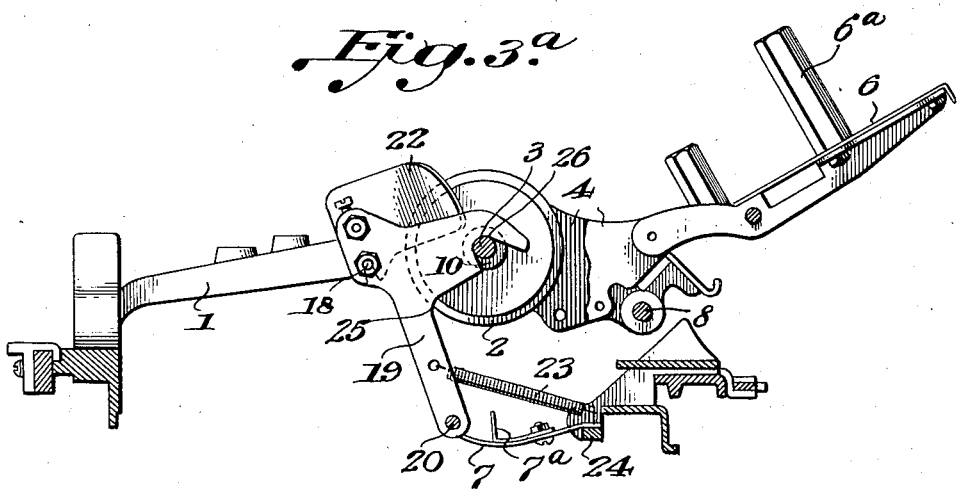

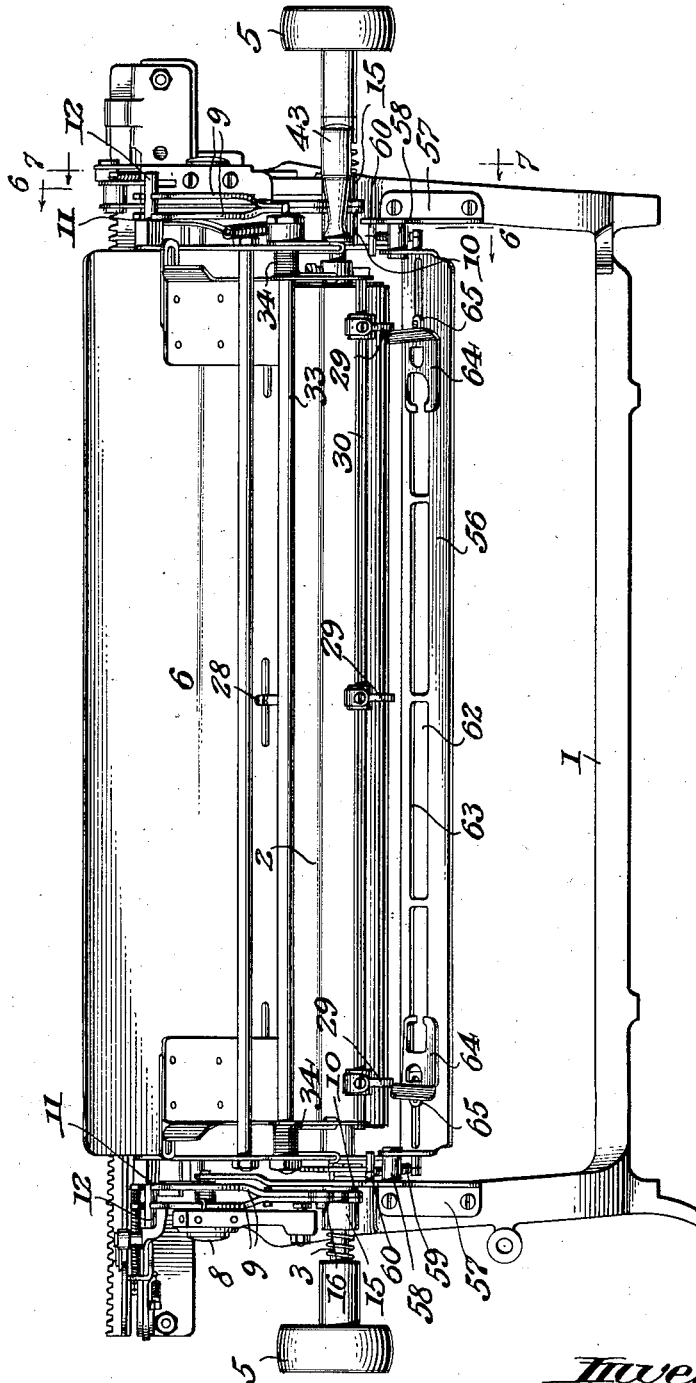

Inventor,
Emil J. Ens
By [signature] Atty.

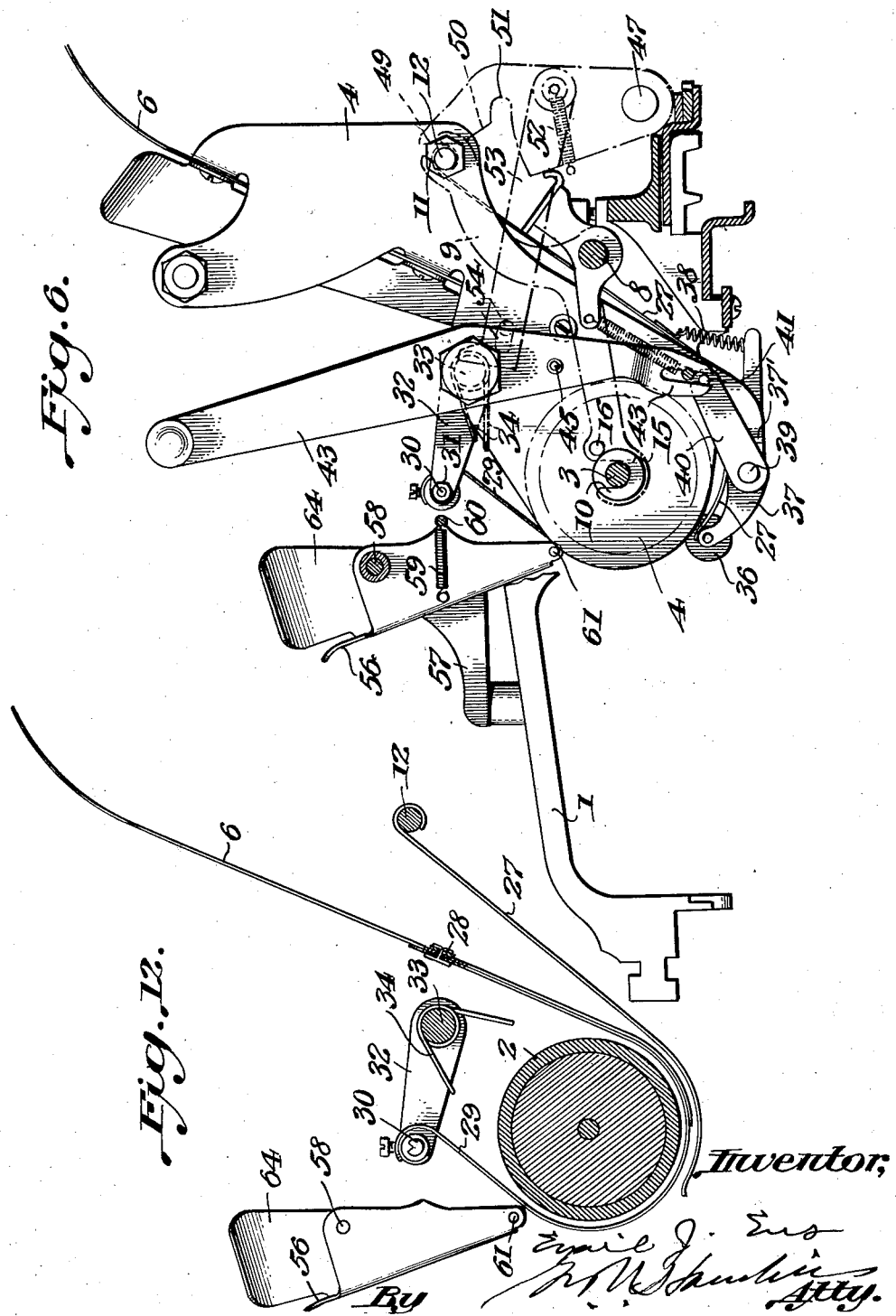

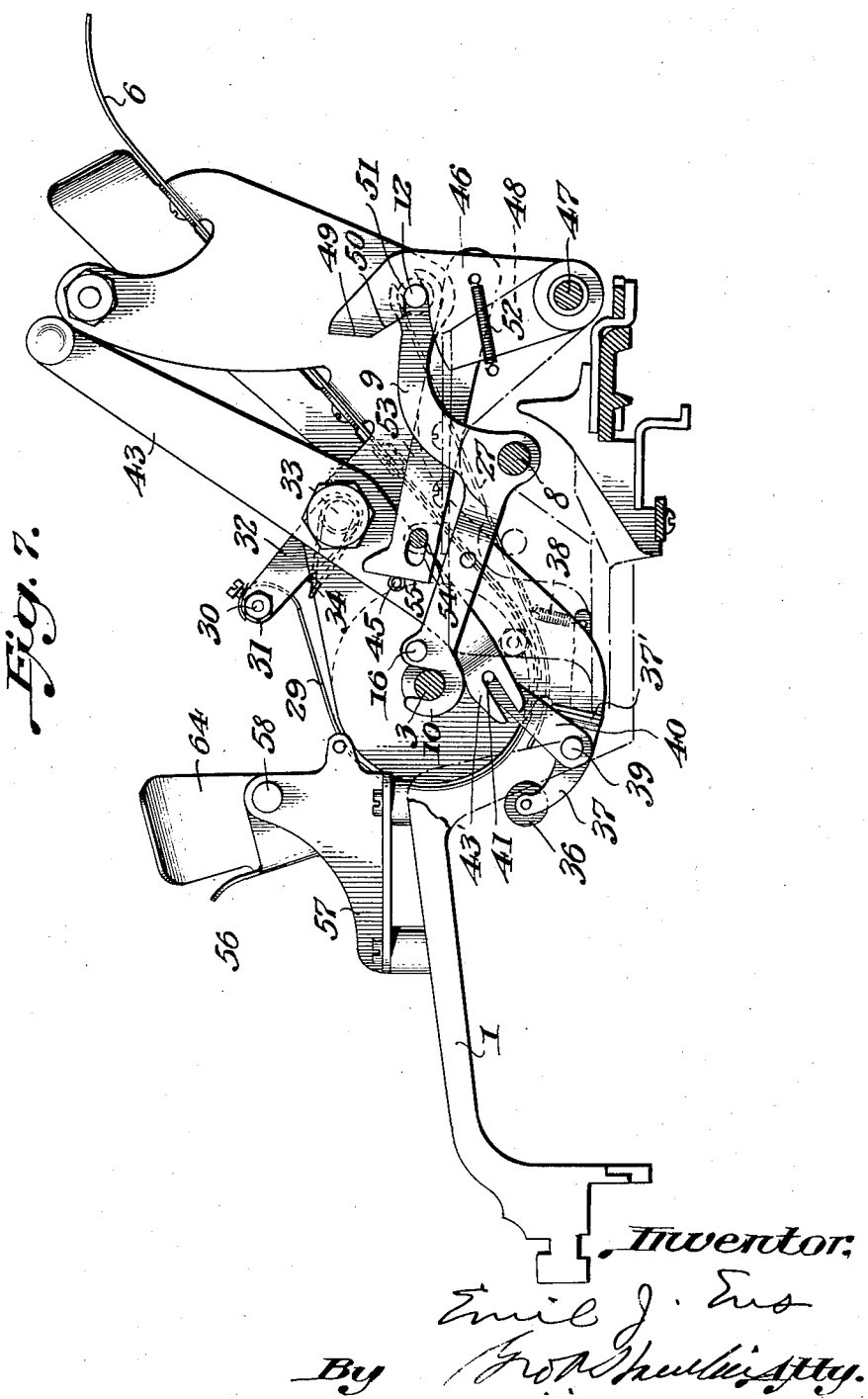

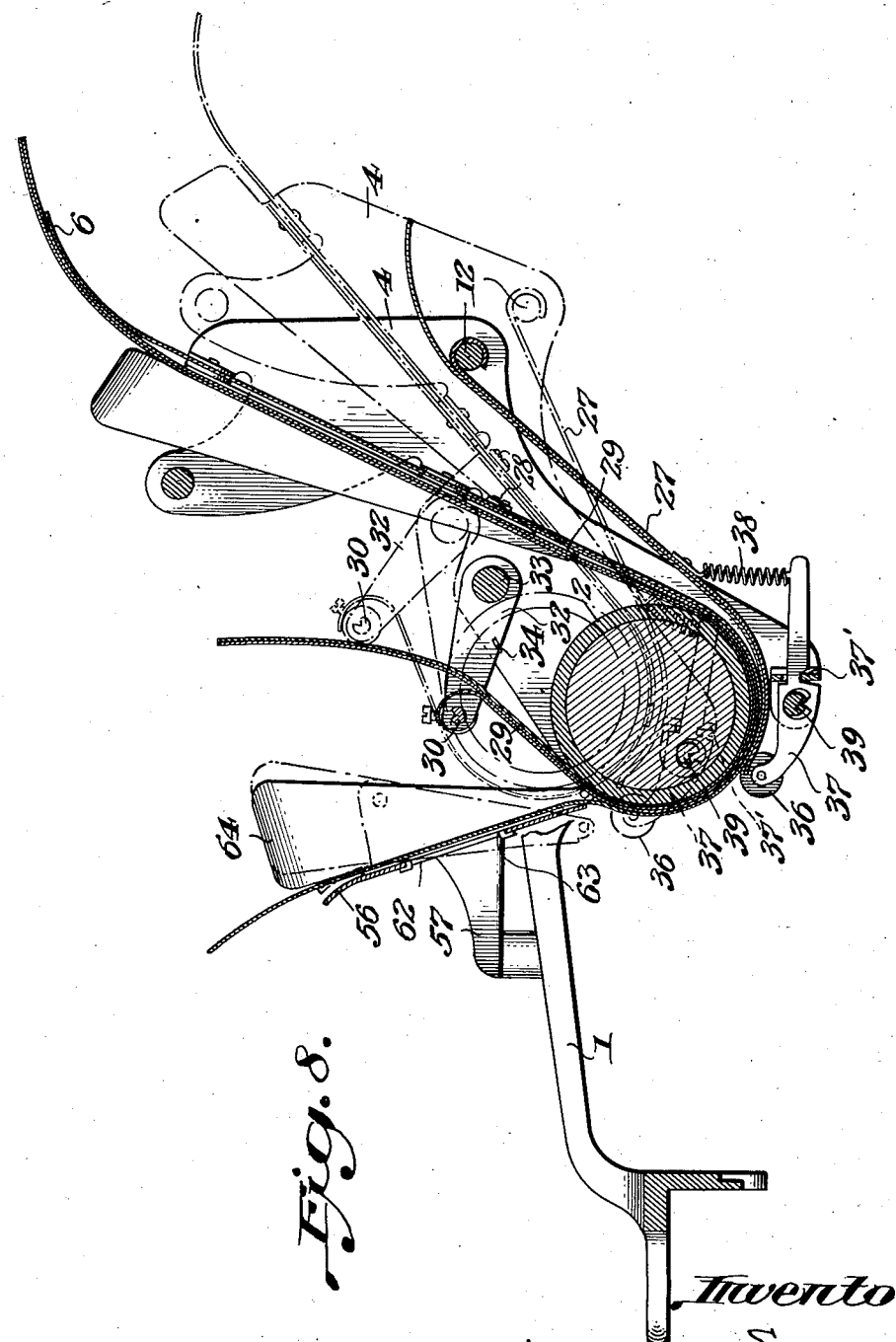

Sept. 6, 1932.  E. J. ENS  1,875,917
OPERATING MEANS FOR FRONT FEED PLATENS
Filed Aug. 27, 1929   9 Sheets-Sheet 9
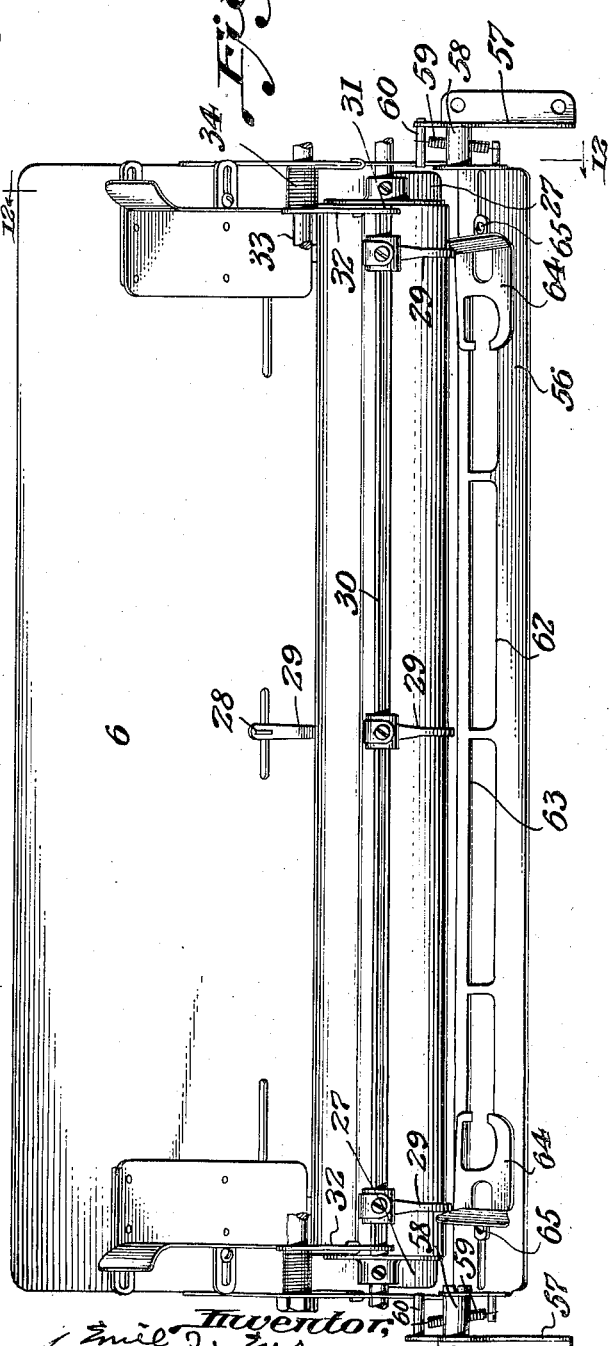

Patented Sept. 6, 1932

1,875,917

UNITED STATES PATENT OFFICE

EMIL J. ENS, OF NEWARK, NEW JERSEY, ASSIGNOR TO ELLIS ADDING TYPEWRITER COMPANY, OF NEWARK, NEW JERSEY, A CORPORATION OF NEW JERSEY

OPERATING MEANS FOR FRONT FEED PLATENS

Application filed August 27, 1929. Serial No. 388,783.

This invention relates to that general class of typewriter or adding machine platens and their paper compression or holding rolls wherein the platen is mounted for bodily shifting movement from the normal position it occupies when in use to a position where it will be spaced from the paper holding or compression rolls, thereby to provide a gap or throat enabling the operator to insert at the front of the platen such sheet or sheets as it is desired to use.

Platens and compression rolls of that character are particularly adapted for condensed billing work and for work involving the use of a journal or master sheet which it is desired to keep in the machine for the accumulation of items printed on individual ledger sheets which are inserted around the platen for temporary use, one after the other. Front feeding of ledger and other sheets for the foregoing purposes prevents disturbing the journal or master sheet and greatly facilitates work of this character.

The object of the present invention is to provide, in connection with the type of platen referred to, improved means for automatically shifting the paper rolls away from the platen when the platen is moved from normal position to front feed position, and, to automatically restore the rolls to paper holding position before the platen resumes its normal position, preferably before the platen is started on its return movement, whereby the paper is gripped and prevented from slipping by reason of the return movement of the platen.

Another object is to provide improved means for automatically locking the platen when it has been shifted to front feed position and for holding the paper rolls away from the platen at that time, to permit easy introduction of the paper.

A further object is to provide improved combined locking and restoring means by which the platen and paper rolls are automatically locked in spaced relationship when the platen is shifted to front feed position and through whose instrumentality the operator may, by a single manual movement, first restore the paper rolls to paper-holding position in respect to the platen and then effect the restoration of the platen to normal position.

In my invention, when the platen is swung from normal to front feed position, either by grasping a special finger-hold or rail carried by the paper table as in one embodiment of the invention, or, by manually operating a lever, as in the preferred embodiment, this action causes the paper rolls to be spaced from the platen and the platen to be locked in elevated, front feed position by improved means. The shifting of the paper rolls as the platen itself is shifted provides an ample throat or gap between the platen and the rolls, as contrasted with the relatively narrow gap hertofore provided in those constructions where the platen alone is shifted away from the rolls, thus facilitating the downward feeding of the sheets at the front of the platen without disturbing the journal sheet or master sheet which may remain in the machine, said later sheet being held by improved means.

The restoration of the platen to normal position after front feeding of the ledger sheet has taken place, is accomplished by a single manual operation. In one embodiment of the invention this is effected by bodily swinging the platen. In the preferred embodiment, an operating lever is manually shifted, which causes the mechanism to first restore the paper holding rolls to paper gripping position so that all the sheets around the platen will be firmly held before the platen begins to shift but when the paper has been gripped, the continued manual operation of the lever then unlatching the mechanism which is adapted to hold the platen in front feeding position and, thereupon, the platen restores itself to normal positon by gravity, assisted by pull exerted by the operator during the unlatching action.

In the accompanying drawings:

Fig. 2 is an elevation at the right-hand end of Fig. 1, the platen-shaft being in section, and the platen in normal position;

Figure 1:
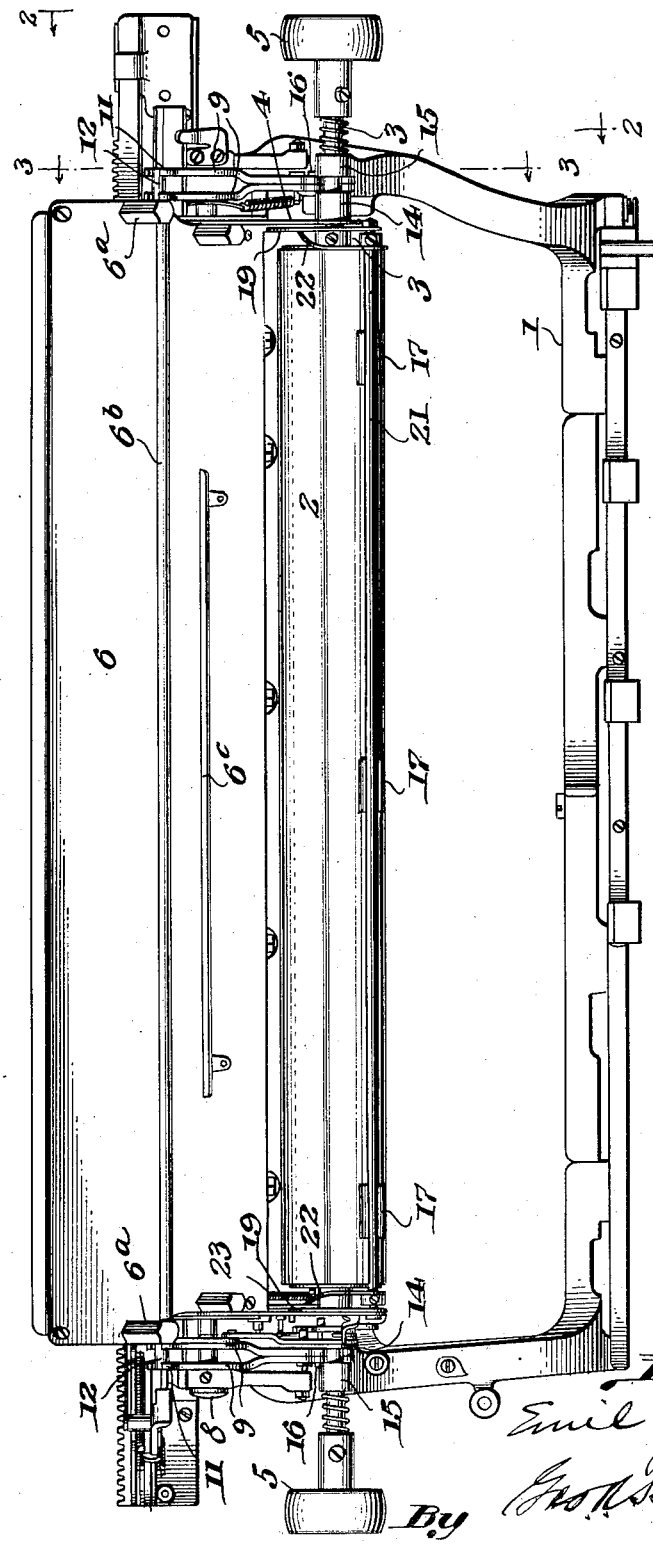
Figure 1 is a plan view of a carriage and platen provided with one embodiment of the present improvements, the platen being in normal position.
Figure 5:
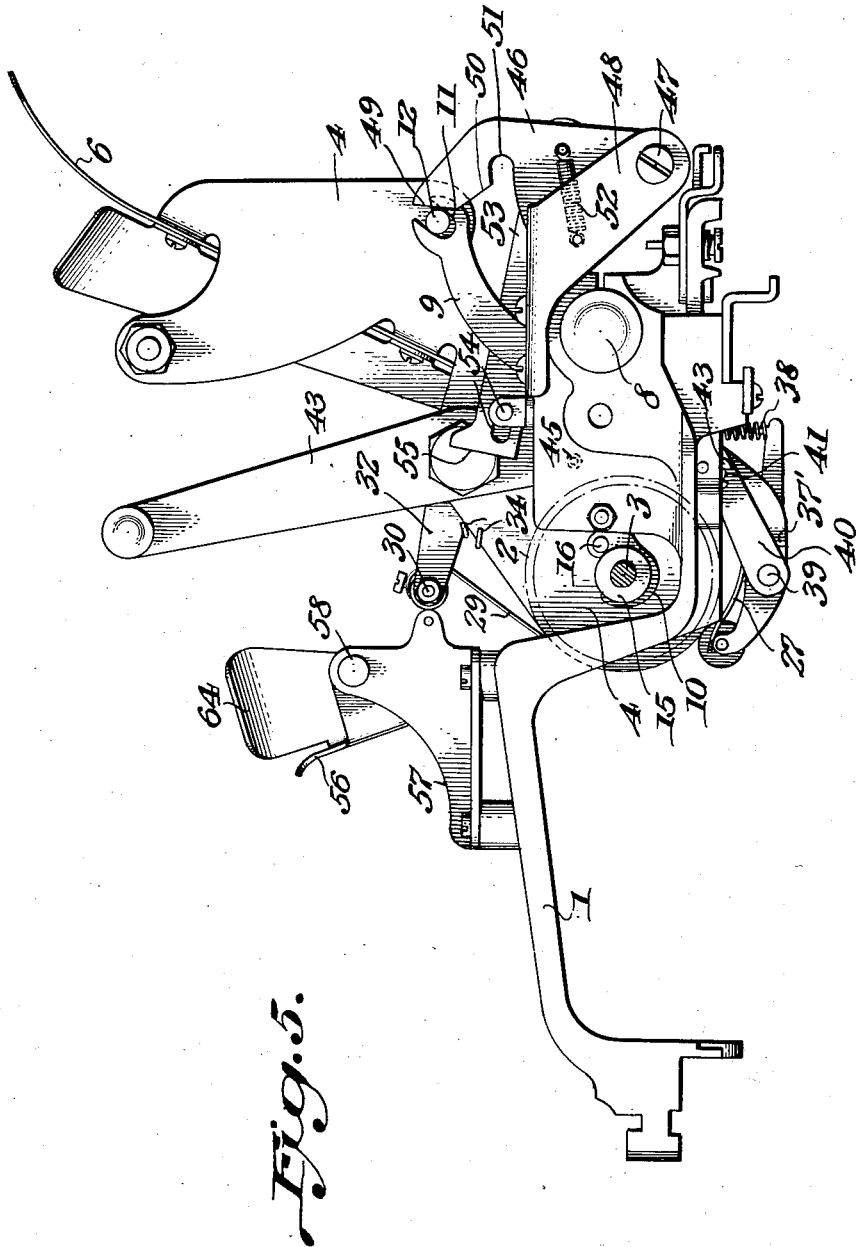

Fig. 2ª is a detail section on the line 2—2, Fig. 1, the platen and cam hook being in normal, unlocked position;

Fig. 3 is a section on the line 3—3, Fig. 1, full lines representing the platen and other parts in normal position and dotted lines showing them in tilted position;

Fig. 3ª is a view like Fig. 2ª, the cam hook locking the platen in raised position;

Fig. 4 is a plan view of another embodiment of the invention;

Fig. 5 is a detail side elevation thereof, showing the platen, paper rolls, and improved operating mechanism in normal position;

Fig. 6 is a vertical section on the line 6—6 of Fig. 4, the parts being in normal position;

Fig. 7 is a vertical section on the line 7—7, Fig. 4, the parts being broken away, and the platen being in raised position for front feeding;

Fig. 8 is a section, in more or less diagrammatic form, showing the paper in position, full lines representing the normal positions of the parts, and dot-and-dash lines the positions thereof when the platen is in front feeding position;

Fig. 9 is a front view of the front feeding paper chute, a ledger sheet being shown to illustrate the position thereof;

Fig. 10 is an end view of the front feeding paper chute;

Fig. 11 is a plan view of the platen, the paper table, and the front feeding paper chute; and Fig. 12 is a section, in more or less diagrammatic form, taken on the line 12—12 of Fig. 11.

Referring first to the embodiment disclosed in Figs. 1 to 3ª, the frame of the carriage appears at 1, the platen is shown at 2, the side plates in which the platen shaft 3 is mounted, appear at 4, and the finger wheels for turning the platen are designated 5.

The paper table 6 is carried by the side plates 4. The guide pan is designated 7, having the adjustable paper stops 7ª which may be shifted forwardly or rearwardly thereon (Figs. 2ª, 3, 3ª).

Posts 6ª project from the paper table 6, and bar or rail 6ᵇ, which connects them, serves as a finger-hold by which the operator may rock the side plates and elevate or lower the platen 2.

A shelf 6ᶜ carried by paper table 6 (Fig. 1) may be used as a support for a pile of blank forms, to locate them so that they may be easily picked up, one at a time, and inserted in the machine.

Mounted to turn on a shaft 8 carried by frame 1 are rockers 9 which have at their forward ends bearings 10 supporting the shaft 3 and at their rearward ends, they are provided with crotches 11 which receive pins 12 projecting from the side plates 4.

Springs 13, coiled around the shaft 8, and co-operating with the rockers 9, may be provided to partially counter-balance the platen 2 to facilitate the manual lifting of the platen.

The shaft 3 carries fixed collars 14 to engage one side of the bearings 10 and said shaft also carries spring-pressed collars 15 which bear against the outer faces of the bearings 10. The bearings 10 have locking lugs 16 which overlap the margins of the collars 15 and prevent the shaft 3 from accidentally detaching from the bearings 10. When the spring-pressed collars 15 are pulled back out of engagement with the lugs 16, the shaft 3 can be lifted out of the bearings 10 and the platen, side plates, table, and other parts carried by the platen shaft, removed as a unit because the pins 12 are then easily lifted out of the crotches 11.

The rockers 9 mount the platen and other parts carried by the shaft 3, in rockable fashion, enabling the platen and said parts to be readily lifted from normally lowered position to an elevated position.

The paper compression or feed rolls 17 are carried by a shaft 18.

Latching cam plates 19 which are pivoted to the frame 1 at 20, rotatably carry the shaft 18. The latching cam plates 19 may be connected by a rod 21 having adjustable paper edge guides 22. The rod 21 rigidly connects the cam plates 19 and braces them against bending.

The cam plates 19 are drawn toward the platen by springs 23 connected to them and to a bar 24 which is connected to frame 1 and supports the guide pan 7.

The plates 19 have cam edges 25 and hooks 26, each adapted to co-operate with the shaft 3 between the platen ends and the side plates 4.

Normally, the straight edges of the cam plates 19 are made to bear against the shaft 3 by the tension of the springs 23, there then being no latching of the platen, as the weight of the platen holds it in its normally lowered position, the under-faces of the bearings 10 resting on the frame 1. When the parts are in this position, the compression or feed rolls 17 bear against the platen 2.

When the operator grasps the bar 6ᵇ and shifts it rearwardly, this causes the platen, side plates, and table to swing upwardly, the rockers 9 turning on the shaft 8. The cam edges 25, being in engagement with the shaft 3, the cam plates 19 are pressed forwardly, disengaging the feed rolls 17 from the platen and at the completion of the movement, the hooks 26 receive and support the shaft 3, the feed rolls 17 then remaining in spaced relationship to the platen. Thus, a throat or gap is defined for the sheets of paper.

To restore the platen to lowered position, it is only necessary for the operator to pull on the bar 6b, whereupon the hooks 26 are pressed back and released from the shaft 3, the cam plates 19 then bearing against the said shaft and the feed rolls being brought into engagement with the paper.

In the embodiment of the invention disclosed in Figs. 4 to 12, improved means are provided enabling the operator to swing the platen to front feeding position, latch it there, and restore it at will, to normal position, in each instance by a single manual operation. This mechanism, when operated, first disposes the platen in latched or locked front feeding position, where it will remain until released, at the same time effecting disengagement of the paper rolls from the paper around the platen, and providing a relatively wide gap between the paper rolls and the platen.

After the front feeding operation of the paper sheet or sheets has been effected, the operator may then restore the platen to normal, lowered position. To accomplish this, the same means employed to position the platen in paper feeding position is reversely manually operated, whereupon the mechanism first effects automatic engagement of the paper rolls with the paper, and release of the locking means, followed by restoration of the platen to normal position.

In this improved form of the invention, the guide pan shifts with the side plates and rockers and is arranged to facilitate front feeding. Furthermore, there is provided a special paper guide carried by the machine frame at the front of the platen in position to facilitate front feeding of the ledger sheet or sheets, downwardly through the gap or throat between the platen and the feed rolls and into the guide pan.

This embodiment of the invention also has special holding means for retaining the journal sheet or master sheet around the platen to prevent the sheet from slipping and to preserve the line spacing thereof when the platen is shifted.

The side plates, shown at 4, carry the table 6 for the journal sheet and they are provided with pins 12 received in the crotches 11 of rockers 9, the latter being mounted to turn on shaft 8, in the same manner as previously described.

Rockers 9 at their forward ends have bearings 10 for the shaft 3 of the platen 2, said rockers being provided with locking lugs 16 to engage spring-pressed collars 15 on the shaft 3, thereby to releasably retain the shaft 3 in the bearings 10.

There is a guide pan 27 which is carried with the side plates and extends underneath the platen from the front thereof rearwardly and upwardly, this pan being adapted to support the ledger sheet and associated sheets.

Adjustably attached by pin and slot connections 28 to the table 6, to permit of lateral shifting, are springy metallic strips 29 which extend down the front face of the table 6 and around platen 2 and upwardly thereabove where they are connected to a crossrod 30 which is attached by nuts 31 to arms 32. The arms 32 are pivoted on a rod 33 carried by side plates 4 and said arms are pressed upwardly by springs 34 which, through the action of the arms 32, hold the springy, flexible metallic strips 29 against the journal sheet around the platen 2. The rod 30 and the pin and slot fastenings 28, permit the journal sheet holders 29 to be adjusted laterally to position them at different points of the length of the platen 2 so that a journal sheet of any width may be held.

The paper holding or compression rolls 36 are carried by rockable arms 37 which are spring-actuated at 38 to normally hold them against the paper and they are adapted to be released by a detent shaft 39. The arms 37 are rockable on a bar 37' attached to the side plates 4 so that said arms are bodily shiftable with said side plates.

Secured to the detent shaft 39 is an arm 40 which has a stud 41.

Pivoted to the rod 33, is a manually operable handled lever 43 which has a fork 43' that receives stud 41, enabling lever 43, when manually pushed rearwardly, to swing the arms 37 and thus release the paper rolls 36 from the platen or paper carried thereby, thus providing a gap to permit front feeding of the paper between the platen and said rolls. The lever 43 has a stud or pin 45 which unlatches the locking mechanism when the lever is pulled forwardly to restore the platen to normal position after front feeding has been accomplished.

A locking cam 46 which is pivoted at 47 on a plate 48 secured to the frame 1, is provided with a head 49 normally engaged the pin 12. The locking cam 46 has a cam surface 50 extending from the head 49 to a locking hook or notch 51 provided in said cam plate. When the platen is raised, it is locked in that position by the entry of the pin 12 in the notch 51 after sliding along the surface 50.

A spring 52 connected to the locking cam 46 and to the plate 48, normally holds the head 49 against the pin 12.

A slidable cam operating link 53 is pivoted to cam 46, and has a pin and slot connection 54 with plate 48. The forward end 55 of link 53 is adapted to be engaged by pin 45 on lever 43, when the said lever is pulled forwardly, to restore the platen, the said pin then forcing the link 53 rearwardly, which unlatches the locking cam 46 from pin 12 and permits the platen to restore to normal position.

When the parts are in the normal position shown in full lines, Fig. 5, the platen 2 is in its lower position, the lever 43 is in its forward position, the rearward part of the rocker 9 is elevated, the pin 12 is engaged with the head 49 of the cam 46, and the link 53 is in its forward position. The paper rolls 36 bear on the platen or the paper which is around the platen.

When it is desired to position the platen for front feeding, the operator pushes the handle-lever 43 rearwardly. This movement swings the side plates 4, platen 2, table 6, guide pan 27, paper rolls 36, and rockers 9, the pin 12 traveling down the cam surface 50 and assuming a position in front of the notch 51.

A slight continuance of the rearward swinging of the lever 43, rocks the arm 40 and turns the detent shaft 39, which turns the arms 37 and releases the paper rolls 36 from the platen. The pin 45 on lever 43 permits the cam-operating link 53 to advance, enabling the locking cam 46 to be drawn forwardly by the spring 52, whereupon the notch or hook 51 receives the pin 12 and locks the rear ends of the rockers 9, thereby holding the parts in the front-feeding position shown in Fig. 7, and as shown in dot-and-dash lines, Fig. 8.

The paper rolls 36, being free of the platen, the ledger sheet can be freely fed downwardly between the rolls 36 and the front of the platen and onto the guide pan 27. The journal sheet or master sheet is held around the platen by the strips 29 and thus the alignment of the master sheet is not disturbed when the paper rolls are released.

To facilitate front feeding of the ledger sheet and any other sheets which may be used, there is provided, by preference, an improved paper guide.

The paper guide, which is shown generally at 56, is pivotally suspended from brackets 57 by pivots 58, the brackets being secured in any suitable manner to the frame 1. Springs 59 connecting the paper guide 56 to studs 60 on the brackets 57, draw the paper guide toward the platen, which movement is limited by the engagement of studs 61 with the forward edges of the side plates 4.

The pins 61 sliding against the forward edges of the side plates 4 cause the paper guide 56 to be swung forward at its lower end upon its pivots 58 when the platen is raised, and thus increases the opening between the paper guide and the platen, as shown by dot-and-dash lines, Fig. 8.

The paper guide 56 is provided with windows or slots 62 whose lower margins constitute an aligning edge 63 to enable the previously printed item to be aligned. The paper margin guides 64 having screw and slot connections 65 with the paper guide 56, may be adjusted laterally to accommodate any width of ledger sheet.

After the ledger and other sheets have been fed down the guide 56 and between the rolls 36 and the platen 2 and onto the pan 27 and alignment has been effected, the operator may, by pulling the lever 43 reversely, that is to say, forwardly, restore the parts to the printing position shown in Fig. 5.

This movement of lever 43, restores the arm 40 to normal position which turns the detent shaft 39 and causes the paper rolls 36 to engage the ledger sheet. Immediately thereafter, the pin 45 on lever 43 engages the forward end of cam-operating link 53, pushing the latter, and the locking cam 46 rearwardly and allowing the pin 12 to release from hook 51. The rockers 9 being thus freed, the platen falls to normal position, which action is assisted by the pull exerted by the operator on lever 43. The pin 12 then re-engages the head 49 of the locking cam 46 and holds the said cam in its rearward position.

What I claim is:

1. In an operating means for front feed platens, the combination with a platen, and a paper table, of end plates carrying the platen and paper table, rockers on which the end plates, the platen and paper table are bodily mounted so that they may be raised and lowered when the rockers are turned, paper compression rolls for the platen, and means operated when the platen is raised which releases the rolls from the platen and retains them in released position so long as the platen remains in raised position and restores them when the platen is lowered.

2. In an operating means for front feed platens, the combination with a platen, and a paper table, of end plates carrying the platen and paper table, rockers pivoted intermediate their ends, the platen being mounted on the forward ends of the rockers and the end plates being mounted on the rearward ends of said rockers, enabling the platen and table to be raised and lowered, paper compression rolls for the platen, and means operated when the platen is raised which releases the rolls from the platen and retains them in released position so long as the platen remains in raised position, and restores them when the platen is lowered.

3. In an operating means for front feed platens, the combination with a platen, of means shiftably mounting the platen so that it may be disposed in normal position or in front feed position, paper compression rolls for the platen, means shiftably mounting the compression rolls, means for locking the platen in front feed position, and manually operable means adapted to shift the platen to front feed position, shift the means for mounting the compression rolls, thereby to release the paper compression rolls from the platen, and render the platen locking means effective when said manually operable means is moved in one direction, and to restore the means for mounting the paper compression rolls to cause them to engage the platen, release the locking means, and return the platen to normal position when said manually operable means is moved in the opposite direction.

4. In an operating means for front feed platens, the combination with a platen, of means shiftably mounting the platen so that it may be disposed in normal position or in front feed position, paper compression rolls for the platen, means shiftably mounting the said compression rolls, means for locking the platen-mounting when the platen is in front feed position, and a manually operable lever adapted to shift the platen to front feed position, shift the means for mounting the compression rolls, thereby to release the paper compression rolls from the platen, and render the platen locking means effective when the lever is shifted in one direction, and to restore the means for mounting the paper compression rolls to cause them to engage the platen, release the locking means, and return the platen to normal position when said lever is moved in the opposite direction.

5. In an operating means for front feed platens, the combination with a platen, of means shiftably mounting the platen so that it may be disposed in normal position or in front feed position, paper compression rolls for the platen, means shiftably mounting the said compression rolls, means for locking the platen-mounting when the platen is in front feed position, and a manually operable lever carried by the aforesaid shiftable means for mounting the platen, said lever when moved in one direction, causing the platen-mounting and the platen to be shifted to front feed position, and to shift the means for mounting the compression rolls, thereby to release the paper compression rolls from the platen, and when moved in the opposite direction, to restore the paper means for mounting the papers compression rolls to cause them to engage the platen, release the locking means, and return the platen-mounting and the platen to normal position.

6. In an operating means for front feed platens, the combination with a platen, of means shiftably mounting the platen so that it may be disposed in normal position or in front feed position, means for locking the platen-mounting when the platen is in front feed position, a detent shaft carried by the aforesaid platen-mounting means, paper compresion rolls carried by the detent shaft, a manually operable lever pivotally carried by the platen-mounting means, whereby the platen may be disposed in front feed position or in normal position according to the direction of movement manually imparted to said lever, an operative connection between the lever and the detent shaft whereby the paper compression rolls may be released when the lever is moved in a direction to shift the platen to front feed position and restored to normal position when said lever is moved in a direction to restore the platen to normal position, and means co-ordinating said lever with said locking means, whereby the locking means is released when the lever is moved in a direction such as will restore the platen to normal position.

7. In an operating means for front feed platens, the combination with a platen, of means shiftably mounting the platen so that it may be disposed in normal position or in front feed position, paper compression rolls for the platen, means shiftably mounting the said compression rolls, means for automatically locking the platen-mounting when the platen is in front feed position, and a manually-operable reversible lever co-ordinated with the means for shiftably mounting the compression rolls, the platen mounting, and the locking means aforesaid, by which the platen-mounting may be shifted in both directions, the mounting for the compression rolls shifted, and the locking means rendered effective or ineffective.

8. In an operating means for front feed platens, the combination with a platen, of means shiftably mounting the platen so that it may be disposed in normal position or in front feed position, paper compression rolls for the platen, means for automatically locking the platen-mounting when the platen is in front feed position, and a manually-operable reversible lever co-ordinated with the platen mounting, the paper compression rolls and the locking means aforesaid, by which the platen-mounting may be shifted in both directions, and the paper compression rolls and locking means rendered effective or ineffective.

9. In a platen mounting, the combination with a pair of rockers pivotally mounted intermediate their ends, of a connected structure comprising end plates, a paper table, and a platen bodily connectible as such to, and bodily disconnectible as such from, the rockers, wherein the platen is rotatably and removably carried by one end of each rocker and the end plates are removably carried by the other ends of the rockers.

10. In an operating means for front feed platens, the combination with a pair of rockers, of end plates, a paper table, and a platen comprising a connected structure bodily connectible as such to, and bodily disconnectible as such from, said rockers, automatically acting locking means for securing the rockers and said connected structure in a given position to which said connected structure and said rockers may be turned, and manually operable means carried by said connected structure which is utilizable for rocking the rockers and the connected structure and also serving as a means for releasing the locking means.

11. In a platen mounting, the combination with a platen support having bearings, of a platen having a shaft mounted to turn in said bearings, abutments on said shaft which engage the bearings, spring pressed collars carried by said shaft, and means on the bearings engaging said spring pressed collars for the purpose of locking the shaft in the bearings.

12. The combination with a platen, paper compression rolls therefor, and means for releasing the paper compression rolls to provide a paper-receiving gap, of a pivoted front feed paper guide arranged to direct the paper to the front of the platen and into the gap aforesaid.

13. The combination with a platen, and a paper table therefor, of flexible paper holding straps connected to said paper table and extending around the platen, and means to which said straps are connected whereby they are rendered adaptable to hold the paper against the platen.

14. The combination with a platen, and a paper table therefor, of flexible paper holding straps adjustably connected to the paper table for lateral shifting to different points of the length of the platen, and spring-tensioned means by which said straps are adjustably connected at their front parts to enable them to be shifted along the platen so as to hold the paper wherever they may be positioned.

15. The combination with a platen-mounting, a platen carried thereby, a paper table carried by the said mounting, a guide pan carried by said mounting, and paper compression rolls carried by said mounting and arranged to permit paper to be fed to the front of the platen and onto the guide pan when the said rolls are released, of means for releasing said paper rolls, and means for holding a master sheet on the platen irrespective of the position of the paper compression rolls, whereby front feeding of a ledger sheet may be effected without disturbing the master sheet.

16. In an operatitng means for front feed platens, the combination with a shiftable platen-mounting, and a platen carried thereby, of a pivoted locking cam adapted to co-operate with the platen mounting to lock said mounting when the mounting is shifted from normal position to front feed position, an operating link for said locking cam, and means for shifting the platen mounting which shifts the link to release the locking cam when the platen is restored to normal position.

17. In an operating means for front feed platens, the combination with rockers, a platen mounting carried thereby which has a projecting pin, and a platen carried by the platen mounting, of a pivoted locking cam with which said pin is adapted to co-operate to lock the rockers when the platen is shifted to paper feeding position, an operating link for said locking cam, and a manually operable reversible lever movable with the rockers and having a pin adapted to co-operate with said link, said lever when shifted in one direction being adapted to turn the rockers to bring the platen to paper feeding position and when shifted in the opposite direction to restore the platen to normal position and also operate the link to thereby unlock the said cam from the pin on the platen-mounting.

18. The combination with a shiftably mounted platen, paper compression rolls therefor, and means for releasing the compression rolls to provide a paper-receiving gap, of a pivoted front feed paper guide arranged to direct the paper to the front of the platen and into the gap aforesaid, and means for automatically swinging the paper guide to widen said gap when the platen is shifted.

19. In a machine of the class described, a platen, means whereby the platen may be moved from one position to another, a paper holding means cooperating with the platen to hold the paper thereagainst, means whereby the paper holding means is moved with the platen, means whereby the paper holding means is moved relatively to the platen, and means to prevent said relative movement until the platen is at rest at the end of its movement.

20. In a machine of the class described, a platen, means whereby the platen may be moved from one position to another, a paper holding means cooperating with the platen to hold the paper thereagainst, means whereby the paper holding means is moved relatively to the platen, means whereby the paper holding means is moved with the platen, and means to prevent said movement of the platen until the paper holding means is at rest at the end of its relative movement.

21. In a machine of the class described, a platen, means whereby the platen may be moved from a printing position to a feeding position, pressure rolls cooperating with the platen to hold the paper thereagainst, means whereby the pressure rolls are moved with the platen into feeding position, means whereby the pressure rolls are moved relatively to the platen, and means to prevent said relative movement until the platen reaches the feeding position.

22. In a machine of the class described, a platen, means whereby the platen may be moved from a feeding position to a printing position, pressure rolls cooperating with the platen to hold the paper thereagainst, means whereby the pressure rolls are moved relatively to the platen, means whereby the pressure rolls are moved with the platen from feeding to printing position, and means to prevent any of said movement of the platen from feeding to printing position until the pressure rolls have completed their relative movement.

23. In a machine of the class described, a platen, a piece adapted to be moved by the operator, means causing a movement of the platen out of printing position upon movement of the piece, paper compression means for the platen, and means to move the paper compression means after the platen has reached the end of its movement, upon further movement of the piece.

24. In a machine of the class described, a platen which may be disposed out of printing position, a piece adapted to be moved by the operator, paper compression means for the platen which is disposed out of paper-holding position when the platen is disposed out of printing position, means to move the paper compression means into operative position upon the movement of the piece, and means to begin movement of the platen toward printing position upon further movement of the piece.

25. In a machine of the class described, a platen adapted to be swung into and out of printing position, paper compression means cooperating therewith, a handle adapted to be manipulated by the operator, means causing the handle to move the platen and the paper compression means, means causing the handle to remain stationary with respect to the platen when the latter is moved by the former, and means causing the handle to move relatively to the platen when the former moves the paper compression means.

26. In a machine of the class described, a platen, means whereby it may be moved into and out of printing position, a paper holding device, means whereby the paper holding device may be moved to an inoperative position, and means to prevent movement of the paper holding device to its inoperative position while the platen is in motion.

27. In a machine of the class described, a platen, means whereby it may be moved into and out of printing position, a paper holding device, means whereby the paper holding device may be moved into and out of operative position, and means to prevent any movement of the platen toward printing position while the paper holding device is out of operative position.

In testimony whereof I affix my signature.

EMIL J. ENS.

CERTIFICATE OF CORRECTION.

Patent No. 1,875,917. September 6, 1932.

EMIL J. ENS.

It is hereby certified that error appears in the printed specification of the above numbered patent requiring correction as follows: Page 5, line 51, claim 5, strike out the word "paper", and line 52, for "papers" read "paper"; page 6, line 119, claim 21, strike out the comma after "may"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.